US010974449B2

(12) United States Patent
Carvalho Cunha De Brito E Faro et al.

(10) Patent No.: US 10,974,449 B2
(45) Date of Patent: Apr. 13, 2021

(54) THREE-DIMENSIONAL PRINTING SYSTEM

(71) Applicant: ADIRA—METAL FORMING SOLUTIONS, S.A., Canelas (PT)

(72) Inventors: Tiago Maria Carvalho Cunha De Brito E Faro, Oporto (PT); Antonio Jose Martins Esteves, Viana Do Castelo (PT); Filipe Rosas Coutinho, Oporto (PT); Joao Paulo Cardoso Dos Santos, Matosinhos (PT)

(73) Assignee: ADIRA—METAL FORMING SOLUTIONS, S.A., Canelas (PT)

( * ) Notice: Subject to any disclaimer, the term of this patent is extended or adjusted under 35 U.S.C. 154(b) by 0 days.

(21) Appl. No.: 16/343,288

(22) PCT Filed: Oct. 23, 2017

(86) PCT No.: PCT/IB2017/056573
§ 371 (c)(1),
(2) Date: Apr. 18, 2019

(87) PCT Pub. No.: WO2018/073816
PCT Pub. Date: Apr. 26, 2018

(65) Prior Publication Data
US 2019/0255768 A1 Aug. 22, 2019

(30) Foreign Application Priority Data
Oct. 21, 2016 (PT) .......................... 109693

(51) Int. Cl.
*B29C 64/153* (2017.01)
*B29C 64/268* (2017.01)
*B29C 64/364* (2017.01)
*B29C 64/371* (2017.01)
*B22F 3/105* (2006.01)
*B33Y 10/00* (2015.01)
*B33Y 30/00* (2015.01)
*B33Y 40/00* (2020.01)

(52) U.S. Cl.
CPC .......... *B29C 64/153* (2017.08); *B22F 3/1055* (2013.01); *B29C 64/268* (2017.08); *B29C 64/364* (2017.08); *B29C 64/371* (2017.08); *B22F 2003/1056* (2013.01); *B22F 2999/00* (2013.01); *B33Y 10/00* (2014.12); *B33Y 30/00* (2014.12); *B33Y 40/00* (2014.12); *Y02P 10/25* (2015.11)

(58) Field of Classification Search
CPC ... B29C 64/153; B29C 64/371; B29C 64/364; B29C 64/268; B22F 3/1055; B22F 2003/1056; B22F 2999/00; Y02P 10/295; B33Y 10/00; B33Y 30/00; B33Y 40/00
See application file for complete search history.

(56) References Cited

U.S. PATENT DOCUMENTS

| 8,915,730 | B2 * | 12/2014 | Matsui .................. B29C 64/112 |
| | | | 425/375 |
| 2004/0084814 | A1 * | 5/2004 | Boyd ..................... B33Y 40/00 |
| | | | 264/497 |
| 2014/0175708 | A1 | 6/2014 | Echigo et al. |
| 2015/0104346 | A1 * | 4/2015 | Nakamura ............ B22F 3/1055 |
| | | | 419/55 |
| 2016/0311027 | A1 * | 10/2016 | Shimoyama .............. B22F 7/02 |
| 2017/0014909 | A1 * | 1/2017 | Tanaka ...................... B22F 7/02 |
| 2017/0021455 | A1 * | 1/2017 | Dallarosa ........... B23K 26/0869 |
| 2017/0173887 | A1 * | 6/2017 | Sasaki .................. B29C 64/165 |
| 2017/0291372 | A1 * | 10/2017 | Milshtein ........... G05B 19/4099 |
| 2018/0304367 | A1 * | 10/2018 | Myerberg ................. B22F 3/18 |
| 2020/0254691 | A1 * | 8/2020 | Mamrak ................ B22F 3/1055 |
| 2020/0262147 | A1 * | 8/2020 | Mamrak ................ B22F 3/1055 |

FOREIGN PATENT DOCUMENTS

| EP | 2431113 A1 | 3/2012 |
| JP | 5355213 B2 | 11/2013 |
| JP | 2014125643 A | 7/2014 |

OTHER PUBLICATIONS

International Search Report and Written Opinion for Corresponding International Application No. PCT/IB2017/056573. (dated Feb. 26, 2018) (10 Pages).

* cited by examiner

*Primary Examiner* — Nahida Sultana
(74) *Attorney, Agent, or Firm* — Lucas & Mercanti, LLP

(57) ABSTRACT

A three-dimensional printing system having a light beam radiating unit is provided, which radiates a light beam onto the powder layer to be sintered or melted, solidifying the powder, a scanning mechanism which redirects and focuses the light beam in a three-dimensional space, a cover that moves integrally with the scanning unit of the light beam, wherein an inlet nozzle and an exhaust manifold ensure inert atmosphere to the process, a powder delivery unit that supplies this material over the object construction area; a powder leveling device leveling the powder delivered from the powder delivery unit to form a powder layer, a powder supply unit for storing and metering material for the delivery unit, constituting a module independent from the system.

8 Claims, No Drawings

THREE-DIMENSIONAL PRINTING SYSTEM

CROSS-REFERENCE TO RELATED APPLICATIONS

This application is a 371 of PCT/IB2017/056573 filed Oct. 23, 2017, which claims the benefit of Portuguese Patent Application No. 109693, filed Oct. 21, 2016, both applications are incorporated herein by reference.

TECHNICAL FIELD

The present application describes a three-dimensional printing system.

BACKGROUND ART

JP2014125643 discloses an apparatus which allows 3D printing, which apparently is for small sizes, since the document does not specify the size of the pieces to be produced, and the fact that the chamber carries the scraper and the powder tank indicate that it is small, while the technology now presented has enormous potential for scalability by a method based on a printing table that moves vertically in the Z direction allowing layer to layer deposition and an open chamber moving over the table in the X and Y directions, which allows printing large continuous pieces in stages ("tiles"). In contrast, in said document, the stated technology consists of raising the chamber throughout the process without vertical movement of the table and all peripherals associated with the powder conveyance and storage are coupled thereto. In this way, there is no provision for a modular supply unit or an independently moving powder delivery and leveling unit. Additionally, the technology now presented also includes software for pre and post processing of the splices between two tiles.

SUMMARY

The present application describes a three-dimensional printing system comprising a light beam radiating unit, a scanning mechanism which redirects and focuses the light beam in a three-dimensional space, a cover that moves integrally with said scanning unit of the light beam, and involves a space above an area of the powder layer that is smaller than the object construction area, surrounding the light beam radiating zone, wherein an inlet nozzle and an exhaust manifold are installed, a powder delivery unit that supplies powder over the object construction area, a powder leveling device and a powder delivery unit, wherein the powder delivery unit and the powder leveling device move independently of the light beam radiating unit, and a powder supply unit responsible for storing and metering material for the delivery unit.

In one embodiment, the three-dimensional printing system comprises an object construction area that moves in the X, Y, and Z directions.

In another embodiment, the three-dimensional printing system comprises an interchangeable modular system consisting of a powder storage structure, a motorized delivering member, a motorized metering member and a chassis comprising all other members.

In yet another embodiment, the three-dimensional printing system comprises a scraper gantry with movement independent from that of the object construction area.

In one embodiment, the three-dimensional printing system comprises a focusing unit.

In another embodiment, the light beam radiating unit of the three-dimensional printing system is a fiber laser.

In yet another embodiment, the light beam radiating unit of the three-dimensional printing system is a diode laser.

In one embodiment, the scanning mechanism of the three-dimensional printing system comprises a galvanometer.

In another embodiment, the three-dimensional printing system comprises at least one oxygen sensor.

GENERAL DESCRIPTION

The present application describes a three-dimensional printing system.

The system now presented allows for three-dimensional printing, in large dimensions, since its process is fully scalable. Throughout the present application all elements that are at least one meter long by one meter wide and that can reach several meters in width and length and up to about one meter in height are considered large-dimension elements.

The system also allows the adaptation of the entire process to large dimensions. The fact that the system comprises an open chamber reverses the whole conventional concept and state of the art knowledge. In the closed-chamber concept, the whole area to be processed is inside the chamber itself. In the case of this technology, the area to be processed is external to the chamber, the later ensuring processing conditions. Based on this—area to be processed independent from the size of the chamber—this technology is highly scalable.

The system comprises a method for real-time controlling the quality of the atmosphere provided by a set of at least one oxygen sensor arranged at several points of the chamber, which allows printing in an inert atmosphere, but with an open chamber.

The system operates with an open chamber, which, contrary to the state of the art, does not require that the area to be processed is inside the chamber for watertightness purposes. This feature provides the system with unprecedented scalability in this type of machine. The system comprises a chamber that moves in the X, Y and Z directions (during processing, only in X and Y), covering the entire table area. Each tile corresponds to a movement of the chamber and the objects will be made from several tiles. The chamber maintains the inert atmosphere through a gas circulation system designed for this purpose. There is a carefully designed nozzle to allow tangential flow to the powder layer. The design of the nozzle is carried out so as not to induce turbulence in the flow, thus there is a flow optimization to avoid disturbances in the powder layer. The components for gas circulation prevent the occurrence of turbulent flows. This flow thus guarantees the inert atmosphere without disturbing the powder layer.

The scalability, in turn, enables a modular construction so that it becomes possible to reconfigure the work area according to the geometry to be produced, as well as it becomes possible to manufacture customized machines.

Inherent to the principle of open chamber and working area superior to the chamber itself, is the tiling principle, that is, the pieces are manufactured layer by layer (according to the Z axis) but also tile by tile (according to XY axes). It is now possible to produce pieces larger than the size of the chamber.

The system comprises a scraper gantry with movement independent from that of the object construction area, which allows adjustable, modular configurations, in order to optimize the amount of powder to be used depending on the work area. In this way, it is possible to quickly cover with powder areas of the table where material is to be processed. The processing of surpluses, necessarily large due to the large size of the table, is also optimized, the powder being recovered and concentrated in the service area.

The system further comprises an interchangeable modular system comprised of a powder storage structure, a motorized delivering member, a motorized metering member and a chassis comprising all other members, allowing storage and supplying of powder and rapid loading when powder must be exchanged.

DESCRIPTION OF THE EMBODIMENTS

Hereinafter, some embodiments shall be described in more detail, which are not however intended to limit the scope of the present application.

The present application describes a three-dimensional printing system comprising a light beam radiating unit which may or may not be arranged above the object construction area and radiates a light beam onto the powder layer to be sintered or melted, solidifying the powder for the construction of an object, a scanning mechanism which redirects and focuses the light beam in a three-dimensional space, a cover that moves integrally with the scanning unit of the light beam, and involves a space above an area of the powder layer that is smaller than the object construction area, surrounding the light beam radiating zone, wherein an inlet nozzle and an exhaust manifold are installed, so as to ensure the necessary inert atmosphere to the process, thus allowing the process to take place in an open chamber; a powder delivery unit that supplies this material over the object construction area; a powder leveling device leveling the powder delivered from the powder delivery unit to form a powder layer, wherein the powder delivery unit and the powder leveling device move independently of the light beam radiating unit, a powder supply unit responsible for storing and metering material for the delivery unit, constituting a module independent from the system.

In one embodiment, the light beam radiating unit that is arranged above the object construction area and radiates a light beam, is preferably a fiber laser or a diode laser.

In another embodiment, the scanning mechanism comprises a galvanometer, which has two mirrors that move at high speed.

In one embodiment, the printing system has a focusing unit, which allows adjusting the focal plane of the laser beam and three-dimensional processing.

The system comprises an open chamber reversing the whole conventional concept and state of the art knowledge. Thus, the area to be processed is external to the chamber, the later ensuring processing conditions. Based on this—area to be processed independent from the size of the chamber—this technology is highly scalable.

The system comprises a method for real-time controlling the quality of the atmosphere provided by a set of at least one oxygen sensor arranged at several points of the chamber, which allows printing in an inert atmosphere, but with an open chamber.

The system operates with an open chamber, which, contrary to the state of the art, does not require that the area to be processed is inside the chamber for watertightness purposes. This feature provides the system with unprecedented scalability in this type of machine. The system comprises a chamber that moves in the X, Y and Z directions (during processing, only in X and Y), covering the entire table area. Each tile corresponds to a movement of the chamber and the objects are made from several tiles. The chamber maintains the inert atmosphere through a gas circulation system designed for this purpose.

The system further comprises an interchangeable modular system comprised of a powder storage structure, a motorized delivering member, a motorized metering member and a chassis comprising all other members, allowing storage and supplying of powder and rapid loading when powder must be exchanged.

The system comprises a scraper gantry with movement independent from that of the object construction area, which allows adjustable, modular configurations, in order to optimize the amount of powder to be used depending on the work area. The processing of surpluses, necessarily large due to the large size of the table, is also optimized, the powder being recovered and concentrated in the service area.

The present technology is of course in no way restricted to the embodiments herein described and a person of ordinary skill in the art will be capable of providing many modification possibilities thereto without departing from the general idea of the invention as defined in the claims.

All embodiments described above are obviously combinable with each other. The following claims further define preferred embodiments.

The invention claimed is:

1. Three-dimensional printing system comprising
   a light beam radiating unit,
   a scanning mechanism which redirects and focuses the light beam in a three-dimensional space,
   a cover that moves integrally with said scanning unit of the light beam and involves a space above an area of a powder layer that is smaller than an object construction area, surrounding a light beam radiating zone, wherein an inlet nozzle and an exhaust manifold are installed,
   a powder delivery unit that supplies powder over the object construction area,
   a powder leveling device, wherein the powder delivery unit and the powder leveling device move independently of the light beam radiating unit,
   a powder supply unit responsible for storing and metering material for the powder delivery unit, and
   an interchangeable modular system consisting of a powder storage structure, a motorized delivering member, a motorized metering member, and a chassis.

2. Three-dimensional printing system according to claim 1, further comprising an object construction area that moves in the X, Y, and Z directions.

3. Three-dimensional printing system according to claim 1, further comprising a scraper gantry with movement independent from that of the object construction area.

4. Three-dimensional printing system according to claim 1, further comprising a focusing unit.

5. Three-dimensional printing system according to claim 1, wherein the light beam radiating unit is a fiber laser.

6. Three-dimensional printing system according to claim 1, wherein the light beam radiating unit is a diode laser.

7. Three-dimensional printing system according to claim 1, wherein the scanning mechanism comprises a galvanometer.

8. Three-dimensional printing system according to claim 1, further comprising at least one oxygen sensor.

* * * * *